United States Patent
Sun et al.

(10) Patent No.: US 6,248,476 B1
(45) Date of Patent: Jun. 19, 2001

(54) METAL AIR CATHODE AND ELECTROCHEMICAL CELLS MADE THEREWITH

(76) Inventors: Fajiong Sun; Fang Wang, both of 402, Building 6, Zhuguang Garden, Huwan Road Zhuhai, GuangDong 519000 (CN)

( * ) Notice: Subject to any disclaimer, the term of this patent is extended or adjusted under 35 U.S.C. 154(b) by 0 days.

(21) Appl. No.: 09/344,388

(22) Filed: Jun. 25, 1999

(30) Foreign Application Priority Data

Mar. 18, 1999 (CN) .................................................. 99235604

(51) Int. Cl.$^7$ ..................................................... H01M 4/50
(52) U.S. Cl. ..................... 429/224; 429/231.8; 429/229; 429/206; 429/232; 429/233; 429/241; 429/242; 429/27; 429/29; 429/34
(58) Field of Search ................................. 429/34, 29, 27, 429/224, 229, 231.8, 206, 232, 233, 241, 242

(56) References Cited

U.S. PATENT DOCUMENTS

| | | |
|---|---|---|
| Re. 31,413 | 10/1983 | Jaggard ................................. 429/27 |
| 3,855,000 | 12/1974 | Jammet ................................ 136/86 A |
| 3,930,094 | 12/1975 | Sampson et al. ..................... 428/240 |
| 3,948,684 | 4/1976 | Armstrong ..................... 136/120 FC |
| 4,041,211 | 8/1977 | Wiacek ................................... 429/36 |
| 4,105,830 | 8/1978 | Kordesch .............................. 429/27 |
| 4,333,993 | 6/1982 | Gibbard ............................... 429/27 |
| 4,557,983 | 12/1985 | Sauer ................................... 429/27 |
| 5,308,711 | * 5/1994 | Passaniti et al. ...................... 429/29 |
| 5,650,246 | 7/1997 | Dopp et al. ......................... 429/233 |

* cited by examiner

Primary Examiner—Carol Chaney
Assistant Examiner—Angela J. Martin
(74) Attorney, Agent, or Firm—Jenkens & Gilchrist, P.C.

(57) ABSTRACT

A novel air cathode and the metal air cells made therewith are provided. With a conductive air diffusion layer of carbon black and polymeric materials, the current collecting substrate is disposed on one side of the air diffusion layer while the active layer is on the other side of the air diffusion layer. The current collecting substrate is in good contact with both the air diffusion layer and the cathode can of the cell, and it has absolutely no direct contact with the active layer. The performance of cells made therewith are significantly improved in high drain discharge situations and the internal impedance of the cells is reduced.

9 Claims, 2 Drawing Sheets

METAL AIR CATHODE AND ELECTROCHEMICAL CELLS MADE THEREWITH

FIELD OF INVENTION

This invention relates to alkaline electrochemical cells, and more particularly to alkaline electrochemical cells having metallic zinc anodes and air cathodes, commonly known as zinc air cells. More particularly, it relates to the button or coin type zinc air cells and its air cathodes.

BACKGROUND OF THE INVENTION

Metal air cells have the highest energy density in the present popular battery systems because only the anode reaction material is packaged within the cell, and the cathode reaction material is oxygen, which is drawn from the surrounding environment. Such cells are usually disk-like in appearance and are called button or coin cells. These cells are ideal power sources for small electronic devices such as hearing aid. An alternative embodiment metal air cell is the big square type for beacons or lanterns.

Metal air button cells take in atmospheric oxygen, and convert the oxygen to hydroxyl ions in the air cathode. The hydroxyl ions then migrate to the anode, where they cause the metal contained in the anode to oxidize. Usually the active anode material in such cells comprises zinc. Such zinc air button cells for hearing aids are well known, and are more fully discussed in references such as U.S. Pat. Nos. 4,041,211 (Wiacek) and 4,105,830 (Kordesch).

In recent years, the increased power consumption of the latest models of hearing aids, such as digital hearing aids, has increased demand for higher power cells. The current output of the zinc air button cells is limited mainly by two factors. First, the rate of mass transport of oxygen into the cathode limits the reaction of the oxygen with water in the alkaline environment. The present invention, however, does not address the oxygen diffusion limitation of the cathode. Second, the conductivity of the air cathode also limits the current output of the cell. In short, the air cathode is generally a poor conductor of electricity, and the present invention is directed to improve this conductivity in a novel manner.

The prior art air cathode generally comprises three layers. The active layer consists of an admixture of active carbon, catalysts, preferably manganese dioxide, and polytetrafluoroethylene (PTFE). Such activating chemicals are supported by a current collecting substrate layer. A current collector usually consists of a cross-bonded screen having nickel-metal strands woven therein, or a fine-mesh expanded metal screen. In practice, the collector is commonly merged into the active layer and surrounded by the activating chemicals of the active layer. A third layer usually consists of one or more pure PTFE membranes, which are impermeable to water and alkaline solution but are permeable to oxygen in the air. This third layer, know as an air diffusion layer, is then laminated to the active layer and the air cathode is complete.

The current collecting substrate is absolutely necessary in this kind of air cathode assembly, as the PTFE air diffusion layer is not conductive. The current generated during electrochemical reaction must pass to the outside circuit from the active layer through this metal collector. Many manufacturers are using this kind of cathode in the metal air battery industry. It is a practical solution to make the cathode more conductive. However, adding a metal screen collector into the active layer is a complex technology.

Another kind of air cathode structure, in mass production for decades in China, does not comprise a current collecting substrate in the active layer. In this kind of air cathode, the active layer is essentially the same as above but the air diffusion layer is conductive, i.e. not pure PTFE membranes. This air diffusion layer is made of polymeric materials such as PTFE and carbon black mixed together so it is conductive. In this way, current from the active layer generated during the electrochemical reaction is transferred to the outside circuit directly through the conductive air diffusion layer, thus the metal collector is not needed. This two-layer air cathode without a current collecting substrate is simple but the electrical resistance is greater than the one with a current collecting substrate in the active layer.

Therefore, it is one object of the present invention to provide a novel air cathode, having a conductive air diffusion layer and a current collecting substrate not in the active layer. The cathode of the present invention is simple to make and has very low electrical resistance.

It is another object of the present invention to provide for metal air cells having high current densities, high working voltages and high power outputs, so that these metal air cells can meet the demands of high power consuming hearing aids.

SUMMARY OF THE INVENTION

The objects of the present invention are attained in an electrochemical metal air cell having a zinc anode, a separator, an electrolyte and an air cathode. The air cathode comprises:

1. An active layer comprising an admixture of active carbon, manganese dioxide and PTFE as a binder, disposed on a first side of the air diffusion layer;

2. A conductive air diffusion layer comprising an admixture of carbon black and polymeric materials, such as polypropylene, polyethylene, or PTFE;

3. A current collecting substrate disposed on the second side of the air diffusion layer, and the other side of the current collector contacting the cathode can of the metal air cell made therewith;

The active layer is also named catalystic layer. It ranges preferably between about 0.05 millimeter and about 2 millimeter thick, and facilitates the reaction between the hydroxyl in the electrolyte and the oxygen of the air. It is conductive because it contains carbon and thus the current could be conducted to the laminated air diffusion layer.

The air diffusion layer is a micro-porous hydrophobic membrane comprising polymeric materials and carbon black, so it is conductive. It ranges preferably between about 0.1 millimeter and 3 millimeter thick. The prior art cells use pure PTFE membranes to make this layer and are not conductive. An important characteristic of the present invention is that the air diffusion layer is conductive.

The current collecting substrate of the present invention is not merged in the active layer, it is laminated to one side of the air diffusion layer while the active layer is laminated on the other side of the air diffusion layer. This novel positioning of the collector significantly reduces the whole electrical resistance of the three-layer laminated air electrode. The collector is preferably a woven nickel screen or fine mesh expanded nickel screen. Other corrosion resistant metals such as stainless steel, silver or plated metals are also suitable collector materials.

The second side of the current collecting substrate is attached to the cathode can of the metal air cell made therewith. Generally, the area of the current collecting substrate is smaller than the air diffusion layer so it can fit within the smaller air chamber of the cathode can. The tight contacts between the laminated air cathode and the cathode can ensure very good conductivity so the overall electrical resistance of the cell is significantly reduced.

DETAILED DESCRIPTION OF THE PREFERRED EMBODIMENTS

Figure 1:
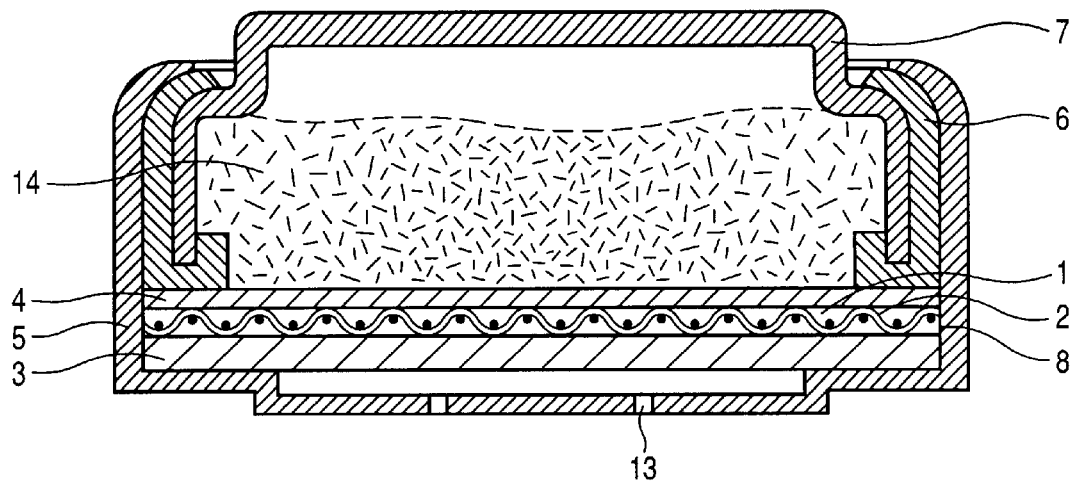
FIG. 1 is a cross-sectional, side elevational view of a metal air cell of the prior art with current collecting substrate laminated with the active layer.

FIG. 1 illustrate a common structure of prior art metal air button cells as described in many patents. The current collecting substrate 2 is disposed within the active layer 1 and surrounded by the materials of the active layer 1. The air diffusion layer 3 comprises one or more layers of microporous polytetrafluoroethylene (PTFE) membranes which are air permeable but liquid impermeable.

This air diffusion layer is generally pure PTFE so it is not conductive. The separator 4, also called a barrier layer, is disposed on the first side of the active layer 1 while the air diffusion layer 3 disposed on the other side. The total multi-layer laminated air cathode assembly is pressed tightly between the cathode can 5 and the anode assembly comprising sealing gasket 6 and anode can 7. Electrical current generated by the electrochemical reaction is passed to the outside circuit through the plural contacting points 8 between the current collecting substrate 2 and the side wall of the cathode can 5.

Figure 2:
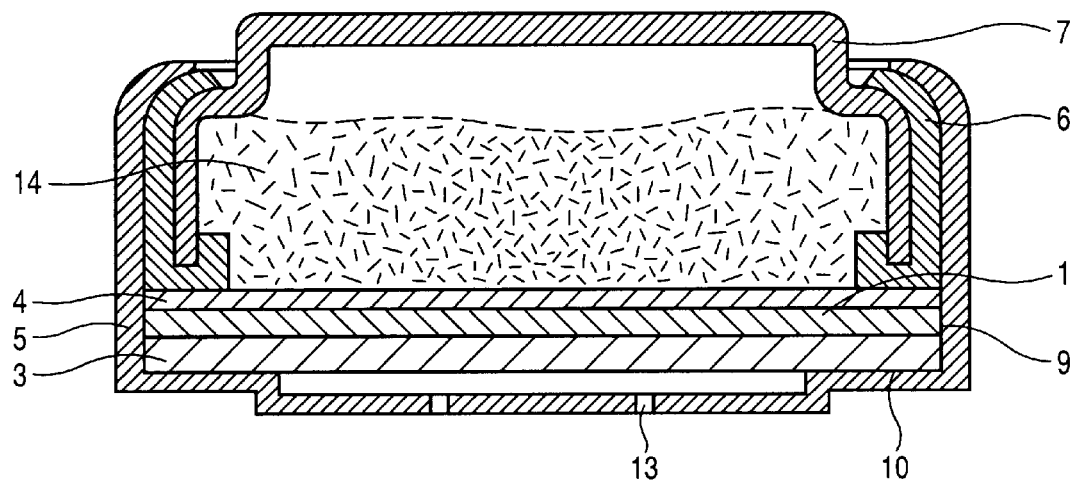
FIG. 2 is a cross-sectional, side elevational view of a metal air cell of the prior art formed without a current collecting substrate.

FIG. 2 shows another kind of metal air cathode structure being used in China for decades. The active layer 1 is laminated on its first side with micro-porous hydrophobic conductive air diffusion layer 3 comprising carbon black and polymeric materials such as PTFE, polypropylene or polyethylene. No current collecting substrate exists. The separator 4 is disposed on the second side of the active layer 1. The three-layer air cathode assembly is pressed tightly between the cathode can 5 and anode assembly comprising sealing gasket 6 and anode can 7. Electrical current generated by the electrochemical reaction is passed to the outside circuit through two ways. The first way is the rounded contacting line 9 between the air cathode and the side wall of cathode can 5, and the second way is the pressed rounded contacting area 10 between the air diffusion layer 3 and the bottom edge rim of the cathode can 5.

The FIG. 2 structure is simple to make but as there is no current collecting substrate, the conductivity of the air cathode assembly is not as good as those in FIG. 1. However, it is still suitable for use in low drain applications including most hearing aids.

Figure 3:
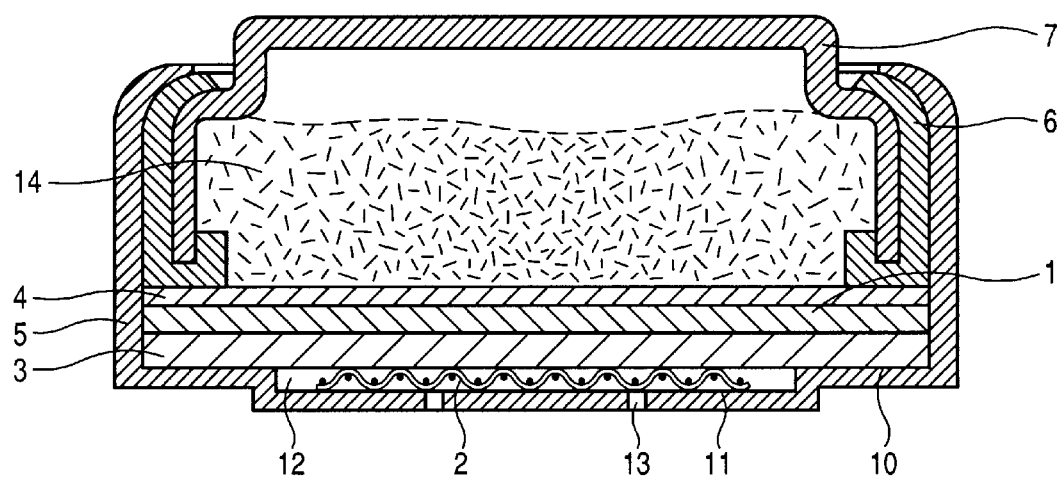
FIG. 3 is a cross-sectional, side elevational view of a metal air cell of the present invention.

FIG. 3 depicts the cell structure according to the present invention. Active layer 1 generally comprises a catalyst, usually manganese dioxide, active carbon and polytetrafluoroethylene (PTFE) as a binder. Many cell compositions have been introduced in the last thirty years. One method is to mill an admixture of 70% active carbon, 20% manganese dioxide and 10% PTFE, all in weight percentage, under rolls to between about 0.05 millimeter and 2 millimeter thick. The electrochemical reaction occurs in this membrane during the cell discharging period.

The air diffusion layer 3 comprises one or more polymeric materials, such as PTFE, polyethylene, polypropylene, or polyamide, and carbon black to make it conductive. Preferably, an admixture comprising 85% PTFE and 15% carbon black is rolled to between about 0.1 millimeter and 2 millimeter thick. This air diffusion layer is micro-porous, hydrophobic, and air permeable but liquid impermeable. The oxygen in the air penetrates and diffuses through it but the electrolyte does not. Another important characteristic is that, because it further comprises carbon black, the air diffusion layer 3 is also conductive. After being laminated on its first side with the active layer 1, the electrical current generated by the electrochemical reaction may pass through the conductive air diffusion layer 3 to the current collecting substrate 2 laminated on the second side of the air diffusion layer. The current collecting substrate 2 does not directly contact the active layer 1.

The current collecting substrate 2 is preferably woven nickel screen or fine mesh expanded nickel screen. Other corrosion resistant metals such as stainless steel, silver or plated metals are also suitable to be the collector material. It is laminated to the air diffusion layer 3 on the side opposite the active layer 1 and is partly merged into the air diffusion layer 3 but does not penetrate it. In this way, the two layers will have the best conductivity in the connecting parts and avoid the penetration of the air diffusion layer by the collector substrate which may lead to the leakage of the cell.

The current collecting substrate 2 contacts the cathode can 5 at plural points 11. Generally its area is smaller than the air diffusion layer 3 and the active layer 1, and fits just within the air chamber 12 and helps the air from the air hole 13 to diffuse. The air diffusion layer 3 is pressed tightly on rim 10 of the cathode can 5 by anode can 7 and sealing gasket 6, and this sealing rim 10 will prevent any leakage of the cell. The anode gel 14 is in the anode can 7 and separated from the cathode assembly by separator 4, generally made of polypropylene, polyethylene or nylon which is pre-coated or grafted with hydrophilic agent. The separator 4 is laminated to the surface of the active layer 1 on the side opposite the air diffusion layer 3.

EXAMPLE

The inventors of the present invention manufactured an number of zinc air button cells, as per the details disclosed in the above description.

Insert the anode can 7 into the sealing gasket 6 pre-coated with battery sealant. Fill in the anode can with anode gel 14 generally mixed by about 70% battery grade zinc powder, about 3% gelling agent usually carboxymethocellulose sodium (CMC) and about 27% potassium solution comprising 40% potassium hydroxide, 3% zinc oxide and 57% distilled water, all in weight percentage. Thus, the anode assembly is complete.

The air cathode assembly comprises an active layer 1 covered on one side with separator membrane 4. The other side of the active layer 1 is laminated to the first side of the conductive air diffusion layer 3. The second side of air diffusion layer 3 disposed on the woven nickel current collecting substrate 2 which is smaller than the air diffusion layer and fits just within the air chamber 12. This air cathode assembly is then disposed on the inside bottom of the cathode can 5. Care must be used to ensure that the current collecting substrate 2 is disposed within the air chamber 12 and not disposed on the sealing area 10 between cathode can 5 and air diffusion layer 3. The cathode can 5 containing the air cathode assembly is then superimposed over the anode assembly, and the cathode can is closed about the anode can by a press machine, thus forming and sealing the electrochemical cell.

Cell discharging results of the present invention have been compared with prior arts cells bought on the market. Line A is the average result of 10 cells constructed according to the present invention. Line B is the average result of 10 cells having the three-layer cathode with a current collecting substrate in the active layer. Line C is the average result of 10 cells having the two-layer cathode with a conductive air diffusion layer but no current collecting substrate.

|   | Discharging Voltage at 620 Ohm load (V) | Discharging Voltage at 150 Ohm load (V) | Cell Impedance at 1000 Hz AC (Ohm) |
| --- | --- | --- | --- |
| A | 1.32 | 1.26 | 3.5 |
| B | 1.31 | 1.25 | 4.0 |
| C | 1.30 | 1.18 | 7.5 |

Measured at one hour after the beginning of discharging.

Clearly, the cell discharging voltage of the present invention is improved significantly when compared to prior art samples B and C, especially on the heavy load discharging situation. The internal impedance of the cell reduced as well. The increased power output allows the cells made in this invention to meet the demands of the latest models of high power hearing aids.

We claim:

1. An electrochemical metal air cell having an anode can, a cathode can, a sealing gasket, a metal anode, a separator, an electrolyte and an air cathode comprising:

(a) an active layer comprising an admixture of active carbon, manganese dioxide and polytetrafluoroethylene;

(b) a conductive air diffusion layer comprising an admixture of carbon black and polymeric materials; and (c) a current collecting substrate comprising a planar metal structure, said active layer being disposed on a first side of said air diffusion layer, said current collecting substrate being disposed with a first side on a second side of said air diffusion layer so it does not contact said active layer, and a second side of said current collecting substrate being disposed in contact with the bottom of the cathode can.

2. The electrochemical metal air cell of claim 1, wherein the metal anode is zinc.

3. The electrochemical metal air cell of claim 1, wherein the electrolyte is alkaline solution.

4. The electrochemical metal air cell of claim 1, wherein the current collecting substrate is not in contact with the active layer.

5. The electrochemical metal air cell of claim 1, wherein the first side of the current collector substrate is laminated tightly to the air diffusion layer and having an intimate contact therewith.

6. The electrochemical metal air cell of claim 1, wherein the second side of the current collecting substrate is in contact with the cathode can of the metal air cell made therewith.

7. The electrochemical metal air cell of claim 1, wherein the current collecting substrate is a metal selected from the group consisting of nickel, silver, copper, gold, stainless steel, cobalt, titanium, platinum, palladium, chromium, indium, steel, and plating-substrate combinations and alloys thereof.

8. The electrochemical metal air cell of claim 1, wherein the current collecting substrate is a planar metal structure being selected from the group consisting of a woven metal screen, an expanded metal screen, a perforated metal sheet, a plurality of wires, and a plurality of interconnected members.

9. The electrochemical metal air cell of claim 1, wherein the polymeric material of the said air diffusion layer is selected from the group consisting of polyethylene, polypropylene, polyamide, polytetrafluoroethylene, and blends thereof.

* * * * *